United States Patent Office

3,066,171
Patented Nov. 27, 1962

3,066,171
PURIFICATION OF CRUDE PENTAERYTHRITOL
John C. Clunie and Eric L. Tollefson, Edmonton, Alberta, Canada, assignors to Canadian Chemical Company, Ltd., Montreal, Quebec, Canada, a company of Canada
No Drawing. Filed Nov. 10, 1958, Ser. No. 772,664
11 Claims. (Cl. 260—637)

This invention relates to pentaerythritol.

Pentaerythritol is commonly produced by the reaction of formaldehyde, acetaldehyde and an alkali such as calcium hydroxide or sodium hydroxide. As a by-product there is obtained the formic acid salt of the alkali employed, e.g., calcium formate or sodium formate. There are also obtained certain pentaerythritol derivatives, such as dipentaerythritol, formals of pentaerythritol, and other organic compounds which are difficult to remove from the pentaerythritol.

It is an object of this invention to provide a novel process for the purification of pentaerythritol.

Other objects of this invention will be apparent from the following detailed description and claims. In this description all proportions are by weight unless otherwise indicated.

In accordance with one aspect of this invention an acidulated solution of crude pentaerythritol containing formals is maintained at an elevated temperature to hydrolyze said formals and is treated with ozone.

In one feature of this invention, crude pentaerythritol containing pentaerythritol formals such as dipentaerythritol formal is treated, in aqueous solution, with hot dilute aqueous sulfuric acid and with ozone. The action of the hot sulfuric acid eliminates the pentaerythritol formals, hydrolyzing them to form pentaerythritol and formaldehyde. The ozone treatment greatly improves the color of the product and decreases its color-forming tendencies. Surprisingly, it is essential that the ozone be in contact with the hot aqueous solution of pentaerythritol during or after the treatment with sulfuric acid. If the aqueous solution of crude pentaerythritol is treated with ozone prior to the treatment with sulfuric acid, the desired results, i.e., improvement in color and the decrease in color-forming tendencies, are not obtained.

According to a second aspect of this invention, the ozone treatment follows hydrolysis of the formals by an ion exchange technique, involving contact of crude pentaerythritol in aqueous solution with a strong acid cation exchange resin in the H+ form. The sodium formate almost unavoidably present in crude pentaerythritol in quantities ranging from 0.1 to 1.0% and therefore in the aqueous solution, is converted to free formic acid by contact with the ion exchange resin, thereby generating the acid pH required for effective ozone treatment.

In common, both modes involve reacting hot aqueous solution of pentaerythritol with ozone, the solution being at acid pH, e.g. pH 5 or below. The pentaerythritol solution should be concentrated, e.g. it should contain about 25–45% by weight of pentaerythritol.

The crude pentaerythritol to which the process of this invention is most usefully applied is one obtained by the condensation of formaldehyde (which is added in excess) with acetaldehyde and sodium hydroxide in aqueous medium, to produce (after suitable intermediate treatments, such as addition of an acidic material to neutralize the mixture, and distillation of excess formaldehyde and of part of the water) a solution containing pentaerythritol and sodium formate, followed by crystallization of the crude pentaerythritol from this solution. One suitable method of manufacture of this crude, unrecrystallized pentaerythritol is disclosed in the Mitchell et al. U.S. Patent 2,790,836. This crude pentaerythritol contains small amounts, e.g., up to about 6% (on a dry basis) of polypentaerythritols (including dipentaerythritol) as well as pentaerythritol formals.

The strong acid cation exchange resin treatment may be applied to this crude pentaerythritol by forming an aqueous solution of about 25–45% pentaerythritol and contacting the solution with the H+ form of the ion exchange resin for 5 minutes to 5 hours while maintaining solution temperatures in the range of about 90° C. to the boiling temperature, which at atmospheric pressure is about 105° C. In addition to hydrolysis of the formal content this treatment converts the sodium formate content to free formic acid. Thus the ion exchange resin treated solution of pentaerythritol generally exhibits a pH in the desired range of about pH 2–5.

The sulfuric acid treatment may be effected by incorporating crude pentaerythritol into a hot aqueous solution containing the acid. This may be done, for example, by dissolving crude pentaerythritol crystals in the water and then adding the sulfuric acid or by dissolving the crude pentaerythritol in hot acidulated water. The proportion of sulfuric acid should be in excess of one equivalent per mole of sodium formate present. Preferably, when the crude pentaerythritol contains less than about 1% sodium formate and the concentration of crude pentaerythritol in the solution is about 25–45%, the $H_2SO_4$ concentration is in the range of about 0.2 to 0.6%. Optimum results are attained at a pH of about 2.2. To facilitate subsequent recovery of the pentaerythritol and to minimize the size of the equipment and the amount of acid necessary, the concentration of the crude pentaerythritol in the solution should be rather high, e.g., in the range of about 25–45% previously mentioned, preferably about 40%. The temperature at which this sulfuric acid treatment is carried out is preferably in the range of about 90° C. to the boiling temperature, e.g. 105° C. It is most convenient to operate at about the boiling point of the acidic solution being treated. The time of sulfuric acid treatment should be above 20 minutes, preferably about 30 to 120 minutes, although times of 8 hours and more have been used without deleterious results.

The ozone treatment is effected upon this hot acidic solution of pentaerythritol by bubbling in gaseous ozone while agitating the solution to promote good contact between ozone and all parts of the solution. During ozone treatment the solution is maintained hot, preferably in the range of about 90° C. to the boiling temperature, e.g. 105° C. The amount of ozone added is preferably not substantially greater than is necessary to initially ozone-saturate the solution of pentaerythritol. The use of further amounts of ozone is wasteful of ozone, and, when very large quantities are supplied, may have some deleterious effects. Generally the proportion of ozone used is in the range of 0.01 to 0.04% of ozone by weight of the solution. It is desirable to employ an efficient system for introducing small bubbles of ozone into the solution so that all or substantially all of the ozone supplied is absorbed in the solution. In particular, a fritted glass sparger or a perforated sparge ring in a well stirred vessel gives almost complete up take of ozone by the pentaerythritol.

When purifying crude pentaerythritol by sulfuric acid treatment, the ozone treatment is preferably effected simultaneously therewith by adding ozone during the course of sulfuric acid treatment. Thus the freshly prepared acidified pentaerythritol solution is maintained hot, preferably in the range of about 90 to 105° C., and agitated while adding ozone, thereby effecting hydrolysis of formals and purification by ozonation at the same time.

If desired, the combined formal-hydrolysis and ozone treatments may be effected as a continuous process.

Although the preceding description has been restricted to sulfuric acid as the treating acid, it should be understood that sulfuric acid may be replaced in equivalent amounts by other strong acids such as hydrochloric.

With regard to ozone treatment, it has been found that acid conditions, not above a pH of about 5, are essential. Ozonation is not effective in neutral or alkaline solution of pentaerythritol. However, once color is removed by ozonation in acid solution in accordance with this invention, neutralization does not bring it back, nor does subsequent handling such as, for example, refluxing the pentaerythritol solution under acid, neutral, or alkaline conditions.

Advantageously the ozonation treatment does not affect or interfere with subsequent handling of the pentaerythritol. Thus after ozone treatment the pentaerythritol solution is preferably cooled to effect recrystallization of the pentaerythritol therefrom.

The use of ozone has the additional advantage of decreasing the corrosive tendency of the acidic pentaerythritol solution on stainless steel vessels (e.g. type 304 and type 316 stainless steel).

The following examples are given to further illustrate this invention.

Example I

Crude washed pentaerythritol crystals were produced by reaction of acetaldehyde, excess formaldehyde and sodium hydroxide in water followed by removal of unreacted formaldehyde and some of the water, cooling to crystallize the crude pentaerythritol, and washing.

These crude washed pentaerythritol crystals were dissolved in hot water to produce a 40% solution to which 0.5% (of said solution) of concentrated $H_2SO_4$ was added. The acidic solution was heated for one hour at its boiling point (105° C.), after which a 100 gram sample of solution was placed in a well stirred heated flask (105° C.) and an air-ozone mixture (containing 2% ozone) from a laboratory ozonizer added through a fritted glass sparger. The solution was then cooled to room temperature and allowed to crystallize, with gentle stirring. The results of varying treatment conditions are shown by the following table.

| $O_3$ Absorbed, mgm. | Air Through litre | Rate, l./min. | Other Treatment | APHA Color of crystals [1] |
|---|---|---|---|---|
|  |  |  | Blank run | 12 |
| 20 | 1 | 0.25 |  | 7½ |
| 30 | 1 | 0.12 |  | 5 |
| 35 | 1.2 | 0.2 | refluxed for 1 hr. (pH 2) after ozone treatment. | 5 |
| 30 | 1 | 0.12 | solution neutralized with NaOH and refluxed one hour after ozone treatment. | 5 |

[1] Measured on a 5% aqueous solution of the crystals.

Example II

A 600 gram batch of a 40% aqueous solution of crude pentaerythritol (said pentaerythritol containing about 7% formals) at 100° C. was charged to a stirrer-equipped heated flask, then 3 grams concentrated $H_2SO_4$ were added and an ozone-air mixture (containing about 2% ozone) passed through the stirred solution at the rate of 0.2 liter/minute. Treatment was continued to pass 215 mgm. of $O_3$ through the solution; of this, 150 mgm. of $O_3$ was absorbed by the solution. The solution was then crystallized as in Example I. The resulting large, discrete, free flowing, dust free crystals had an APHA color of 5 (measured in 5% solution in water) and a formal content less than 0.5%. Crystals obtained in the same way except that the ozone and sulfuric acid treatments were omitted had an APHA color of 10 and a 7% formal content; these crystals were smaller and had a tendency to agglomerate and to dust. Crystals obtained in the same way using sulfuric acid but without the ozone treatment, while discrete and well-formed, had an APHA color of 15.

Example III

A 3-necked, 3-liter boiling flask equipped with an outlet and stopcock at its base was connected through one neck to a reservoir flask containing 40% pentaerythritol solution. A stirrer extended through another neck, and an ozone inlet tube drawn to a fine point fitted through the third neck together with an exit tube for exhaust air. The boiling flask was warmed by a heating mantle to maintain solution temperature of 97–99° C. throughout this run.

2,000 grams of 40% aqueous solution of crude pentaerythritol (containing 6–7% formals) was charged to the flask together with 10 grams of concentrated $H_2SO_4$, and addition of ozone commenced. After 200 mgms. of ozone had been taken up over a period of 4 hours, continuous solution removal at the rate of 500 gms./hr. was commenced, an equivalent amount of fresh acidified solution being added simultaneously and continuously. The ozone feed rate was maintained for about 50 mgm./hr. take-up, continuously.

The color improvement was substantially the same as in the previous example, i.e., the product crystals had natural APHA color of 5.

Example IV

Crude, highly colored pentaerythritol crystals were dissolved in hot water to a 40% solution and passed through a bed of strong acid cation exchange resin beads. The ion exchange resin was a sulfonated styrene divinyl benzene copolymer in the H+ form (Amberlite 120, Rohm & Haas). Contact time between solution and resin was 2 hours at 100° C. This treatment reduced the formal content from an initial 6.1% to below 0.5%. The initial sodium formate content was 0.33% and the pH of the treated solution was 2.9.

A portion of the hot treated solution was subsequently contacted with ozone at 100° C. until a total of 0.01% by weight was absorbed, and the solution was then cooled and crystallized. The resulting large, discrete, free flowing, dust free crystals had an APHA color of 5 (measured in 5% aqueous solution). Crystals obtained in the same way except that the ozone and resin treatments were omitted had an APHA color of 30; these crystals were smaller and had a tendency to agglomerate and to dust. Crystals obtained in the same way using the resin treatment but without the ozone treatment, while discrete and well-formed, had an APHA color of 30.

It is to be understood that the foregoing detailed description is given merely by way of illustration and that many variations may be made therein without departing from the spirit of our invention.

Having described our invention, what we desire to secure by Letters Patent is:

1. Process for the purification of crude pentaerythritol containing pentaerythritol formals, which comprises maintaining a solution of said crude pentaerythritol in acidulated water at an elevated temperature to hydrolyze said formals, the pH of the solution being no higher than about 5, and contacting said acidulated solution with ozone.

2. Process for the purification of crude pentaerythritol containing pentaerythritol formals, which comprises maintaining a solution of said crude pentaerythritol in water at a pH no higher than about 5 and at a temperature of from about 90° C. to the boiling point of the solution to hydrolyze said formals, and contacting said solution with ozone.

3. Process as set forth in claim 2 in which the water contains sulfuric acid.

4. Process as set forth in claim 2 in which the ozone is contacted with the solution simultaneously with said hydrolysis.

5. Process as set forth in claim 2 in which the pH is about 2.2 and said elevated temperature is about 90 to 105° C.

6. Process as set forth in claim 2 in which the solution is cooled after being contacted with the ozone to precipitate crystals of pentaerythritol.

7. Process as set forth in claim 2 in which the acidulated water solution of pentaerythritol contains free formic acid.

8. Process for the purification of crude pentaerythritol which comprises reacting a 25-45% aqueous solution thereof of a pH in the range of about pH 2-5 with from 0.01% to 0.04% by weight thereof of ozone while maintaining solution temperature in the range of about 90 to 105° C.

9. Process as set forth in claim 8 wherein the crude pentaerythritol initially contains minor percentage of sodium formate and formals and wherein a 25-45% aqueous solution of the crude pentaerythritol is first contacted with a strong acid cation exchange resin in the H+ form to hydrolyze the formals and to convert the sodium formate content to free formic acid.

10. Process as set forth in claim 9 wherein the solution is cooled after being contacted with the ozone to precipitate crystals of pentaerythritol.

11. Process as set forth in claim 10 wherein the solution is contacted with the cation exchange resin and the ozone as a continuous process.

References Cited in the file of this patent

UNITED STATES PATENTS

| | | |
|---|---|---|
| 2,464,430 | Barth et al. | Mar. 15, 1949 |
| 2,532,252 | Wyler | Nov. 28, 1950 |
| 2,629,746 | Cox | Feb. 24, 1953 |
| 2,759,023 | Kool et al. | Aug. 14, 1956 |

FOREIGN PATENTS

| | | |
|---|---|---|
| 1,034,611 | Germany | July 24, 1958 |

OTHER REFERENCES

Ser. No. 300,984, Nagel et al. (A.P.C.), published July 13, 1943.